United States Patent [19]

Olsbo et al.

[11] 4,023,137

[45] May 10, 1977

[54] DEVICE FOR INDICATING THE OIL LEVEL IN A COMBUSTION ENGINE CRANKCASE

[75] Inventors: Åke Gunnar Olsbo, Torslanda; Dag Anders Windt, Kungalv; Lars-Erik Lundberg, Hisings-Backa, all of Sweden

[73] Assignee: AB Volvo Penta, Goteborg, Sweden

[22] Filed: July 28, 1975

[21] Appl. No.: 599,730

[52] U.S. Cl. .............................. 340/59; 340/52 F; 340/244 R; 116/118 R
[51] Int. Cl.² .......................................... B60Q 1/00
[58] Field of Search ............... 340/52 F, 59, 244 R, 340/244 A, 244 B; 116/4, 109, 118 R

[56] References Cited

UNITED STATES PATENTS 3,238,518  3/1966  Ballou ............................ 340/59 X

FOREIGN PATENTS OR APPLICATIONS 590,498  1/1960  Canada ........................... 340/52 F Primary Examiner—Alvin H. Waring
Attorney, Agent, or Firm—Young & Thompson

[57] ABSTRACT

A device for indicating the oil level of an internal combustion engine crankcase comprises a crankcase oil level sensor electrically connected to a change-over switch provided in the electrical connection between the engine fuel tank level sensor and its fuel indicator, thereby allowing the same in indicator to be used for reading fuel and oil level selectively. The change-over switch preferably forms part of the ignition switch so that oil level reading is prevented when the engine is running.

1 Claim, 1 Drawing Figure

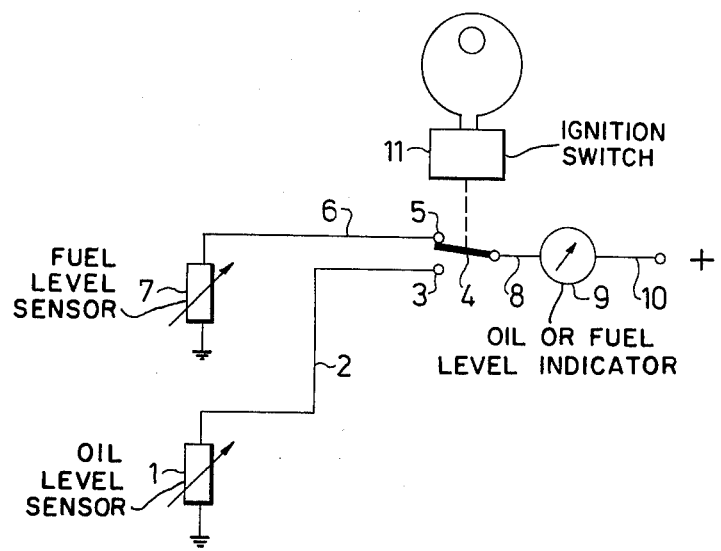

DEVICE FOR INDICATING THE OIL LEVEL IN A COMBUSTION ENGINE CRANKCASE

Measurement of the oil level in internal combustion engine crankcases, e.g. in vehicles, normally takes place through the use of a dipstick in the motor. To measure the oil level the motor hood must be opened, the dipstick located, withdrawn and wiped off. Thereafter the dipstick is reinserted, withdrawn and read. Finally the dipstick must be returned to its place and the motor hood closed. Measurement is thus quite involved and is associated with messy work. For an inexperienced person and particularly under poor lighting conditions measurement can entail considerable problems.

The purpose of the present invention is to achieve a device for indicating the oil level in an internal combustion engine in which the dipstick is eliminated and very simple reading of the oil level is permitted. In addition the device shall be simple and inexpensive and lend itself to mass production, e.g. in connection with the manufacture of motor vehicles.

This is achieved in the invention with a device comprising an oil level measuring electrical sensor and an indicating means and wherein the indicating means is comprised of an existing indicating means belonging to the engine or to other equipment which means via a lead is connected to an existing signal source, this lead being provided with a changeover switch to which the oil level sensor is connected so that selectively this source or the existing signal source can be connected to the indicating means. As an oil level sensor is employed for example an electrical resistor whose resistance is dependent on the oil level. The fuel indicator of the combustion engine or motor vehicle can be employed as an existing indicating means. This device thus requires only the oil level sensor, an electrical lead and a change-over switch, the cost of the relatively expensive indicating means being eliminated. In addition to this there is the advantage that no extra space is required for mounting a separate oil level indicator on the instrument panel of the engine or motor vehicle. Each additional indicator entails, in addition, a drawback in that the readability of the previously existing instruments is worsened. Moreover, a permanently connected oil level indicator would be confusing since it could only give a correct reading with the engine at rest.

According to a further development of the invention this drawback is also avoided with the aid of control means which prevents the oil level indicator being connected to the indicating means when the engine is running.

According to a preferred embodiment of the invention the change-over switch and the control means consist of an ignition switch for the internal combustion engine. An existing switch of this type can, if it does not already have unused contact functions, be easily supplemented with the required switching contacts and forms, per se, a control means which in the garage or accessory position couples in the oil level sensor to e.g. the fuel level indicator, but in the start position disconnects the oil level sensor and instead connects the fuel level sensor to the fuel level indicator.

An embodiment of the invention is described in detail below with reference to the accompanying drawing which schematically shows a device for a motor vehicle for indicating the oil level.

A variable resistor 1, whose resistance varies depending on the oil level in the engine is connected at one end to chassis and at the other end via a lead 2 is connected to a contact 3 on the change-over switch 4 which is included in or is operated with the motor vehicle ignition switch 11. A second switch contact 5 in the change-over switch 4 is via a lead 6 connected with one end of a second variable resistance 7 whose second end is connected to chassis. The resistor 7 is employed as a fuel level indicator and its resistance varies depending on the fuel level in the motor vehicle fuel tank. A lead 8 goes from the change-over switch 4 to an indicator 9 which consists of the instrument for showing the fuel level located on the vehicle instrument panel. The instrument 9 is connected via a lead 10 to a voltage source +.

When the ignition switch assumes the drive or start position, the change-over switch 4 connected thereto assumes the position shown in the drawing. In this position the fuel level sensor 7 is connected with its shown instrument 9 which, in this switching position, thus operates normally and gives the driver continuous information about the fuel level in the vehicle fuel tank. When the ignition switch is turned to the garage or accessory position, i.e. when the ignition is disconnected but certain other equipment receives current, the change-over switch 4 assumes a position in which the contact 3 is connected so that the oil level sensor 1 is connected to the indicator 9. The driver can thus quite easily read the oil level in the engine by allowing the ignition key to pause an instant in the accessory position each time the engine is to be started.

A breaker switch (not shown) in the ignition switch is normally connected between the lead 10 and the voltage source.

The invention is not limited to the embodiment described above and shown on the drawing. Instead of the change-over switch operated by the ignition lock it is, for example, possible to use a change-over switch mounted on the instrument panel beside the indicator 9 which is actuated by a button which the driver presses when he wishes to read the oil level. The indicator 9 can also consist of an arbitrary indicator having a suitable scale or a separate oil level scale.

What is claimed is:

1. A device for indicating the oil level in an internal combustion engine crankcase of a motor vehicle, comprising an indicator, a first electrical sensor for detecting fuel level in said vehicle, a second electrical sensor for detecting oil level in said crankcase, an ignition lock switch for said internal combustion engine, the ignition lock switch having at least one position in which the engine ignition is switched on and at least one position in which the engine ignition is switched off, and means responsive to the position of said ignition lock switch to connect said first sensor to said indicator when the ignition lock switch assumes an ignition-on position and to connect said second sensor to said indicator only when the ignition lock switch assumes an ignition-off position, whereby said indicator indicates fuel level when the engine is running and oil level only when the engine is not running.

* * * * *